United States Patent [19]

Akagi et al.

[11] Patent Number: 5,373,223
[45] Date of Patent: Dec. 13, 1994

[54] POWER CONVERTER/INVERTER SYSTEM WITH INSTANTANEOUS REAL POWER FEEDBACK CONTROL

[75] Inventors: Yasufumi Akagi, Nagaoka; Norio Ito; Tatsuya Shimoda, both of Suwa, all of Japan

[73] Assignee: Seiko Epson Corporation, Tokyo, Japan

[21] Appl. No.: 82,004

[22] Filed: Jun. 24, 1993

Related U.S. Application Data

[60] Continuation of Ser. No. 897,148, Jun. 11, 1992, abandoned, which is a division of Ser. No. 558,650, Jul. 27, 1990, Pat. No. 5,136,494.

[30] Foreign Application Priority Data

Jul. 27, 1989 [JP] Japan .................................. 1-194498
Jun. 22, 1990 [JP] Japan .................................. 2-165047

[51] Int. Cl.$^5$ ................................................ H02M 5/40
[52] U.S. Cl. ................................ 318/722; 318/438; 318/811; 363/34; 363/98
[58] Field of Search .......................... 363/34, 37, 95, 97, 363/98; 318/599, 722, 807, 809, 811, 805, 806, 808, 810, 803, 801, 802, 438

[56] References Cited

U.S. PATENT DOCUMENTS

| | | | |
|---|---|---|---|
| 3,911,340 | 10/1975 | Plunhett | 318/802 |
| 4,328,454 | 5/1982 | Ohuyama et al. | 318/803 |
| 4,455,522 | 6/1984 | Lipo | 318/809 |
| 4,517,634 | 5/1985 | Sakai | 363/35 |
| 4,555,750 | 11/1985 | Matsumura et al. | 363/37 |
| 4,862,340 | 8/1989 | Inokuchi | 363/35 |
| 4,941,079 | 7/1990 | Ooi | 363/35 |
| 5,136,494 | 8/1992 | Akagi et al. | 363/34 |
| 5,198,981 | 3/1993 | Collier-Hallman et al. | 364/424.05 |

OTHER PUBLICATIONS

T. Okuyama et al., "High Performance AC Motor Speed Control System using GTO Converters", Proceedings of IPEC, Tokyo '83, IEE, pp. 720–731, Apr. 1983.

*Primary Examiner*—William M. Shoop, Jr.
*Assistant Examiner*—John W. Cabeca
*Attorney, Agent, or Firm*—Eric B. Janofsky

[57] ABSTRACT

A power converter/inverter system for a load comprises a converter circuit for converting an alternating current power input into a direct current power intermediate signal in response to a first PWM voltage. An inverter inverts the DC power intermediate signal into an AC power output in response to a second PWM voltage. A smoothing filter is arranged in series between a converter and the inverter for filtering the DC power intermediate signal. An instantaneous real power calculating circuit calculates an instantaneous real power (IRP) relative to the inverter and is determined by a torque current command value and a load angular speed signal. A converter controller controls the first PWM voltage of the converter in accordance of a combination a predetermined converter amplitude setpoint, a DC voltage present at the DC power intermediate signal, and the instantaneous real power product. An inverter controller controls the second PWM voltage of the inverter in accordance with the inverter amplitude setpoint and amplitude of the AC power output.

4 Claims, 8 Drawing Sheets

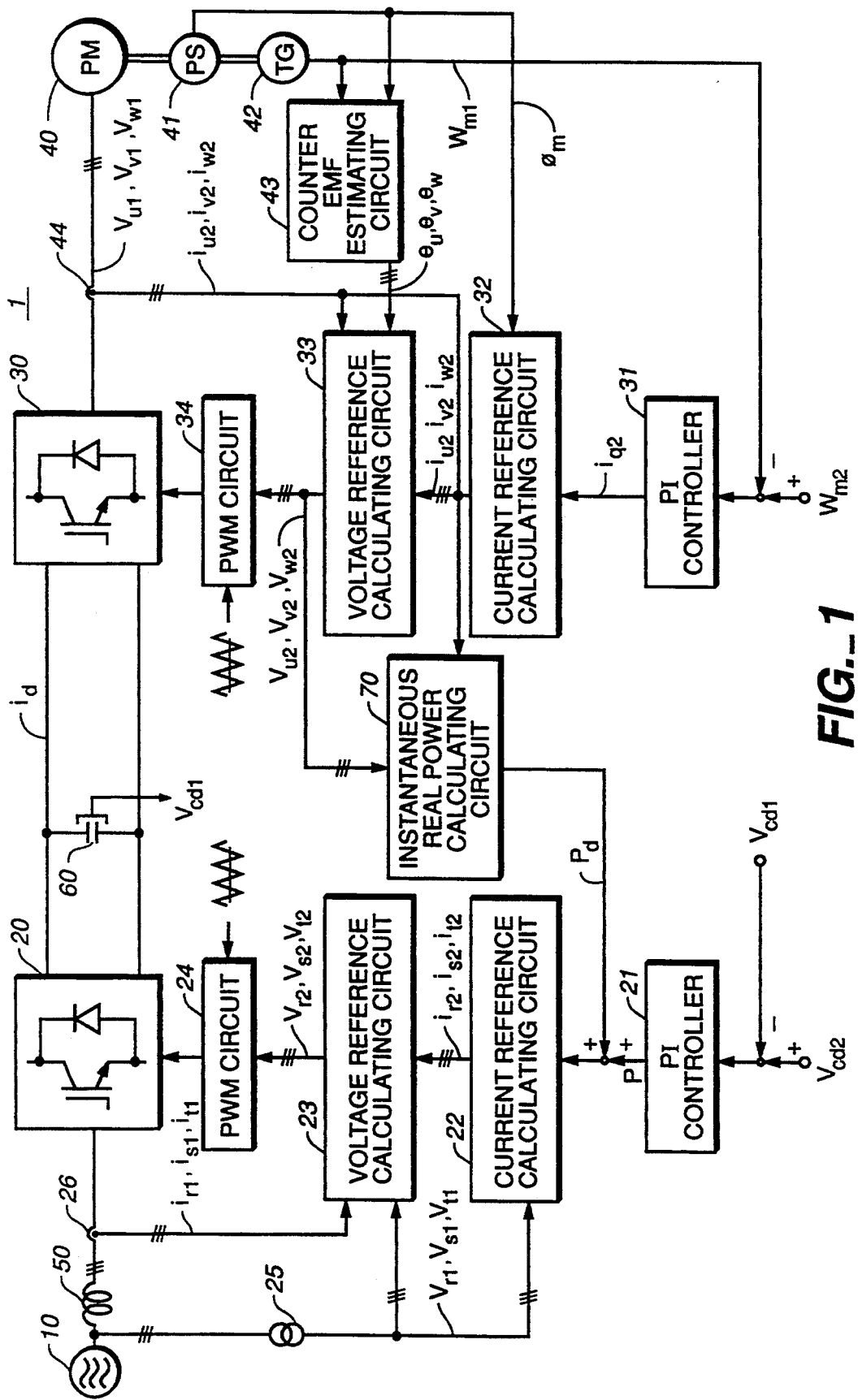
FIG._1

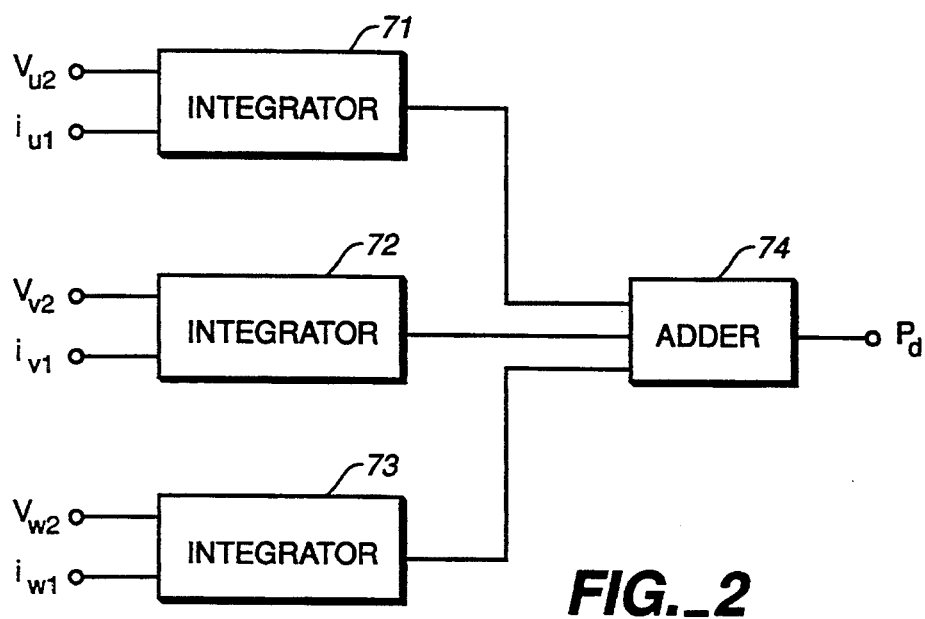
FIG._2
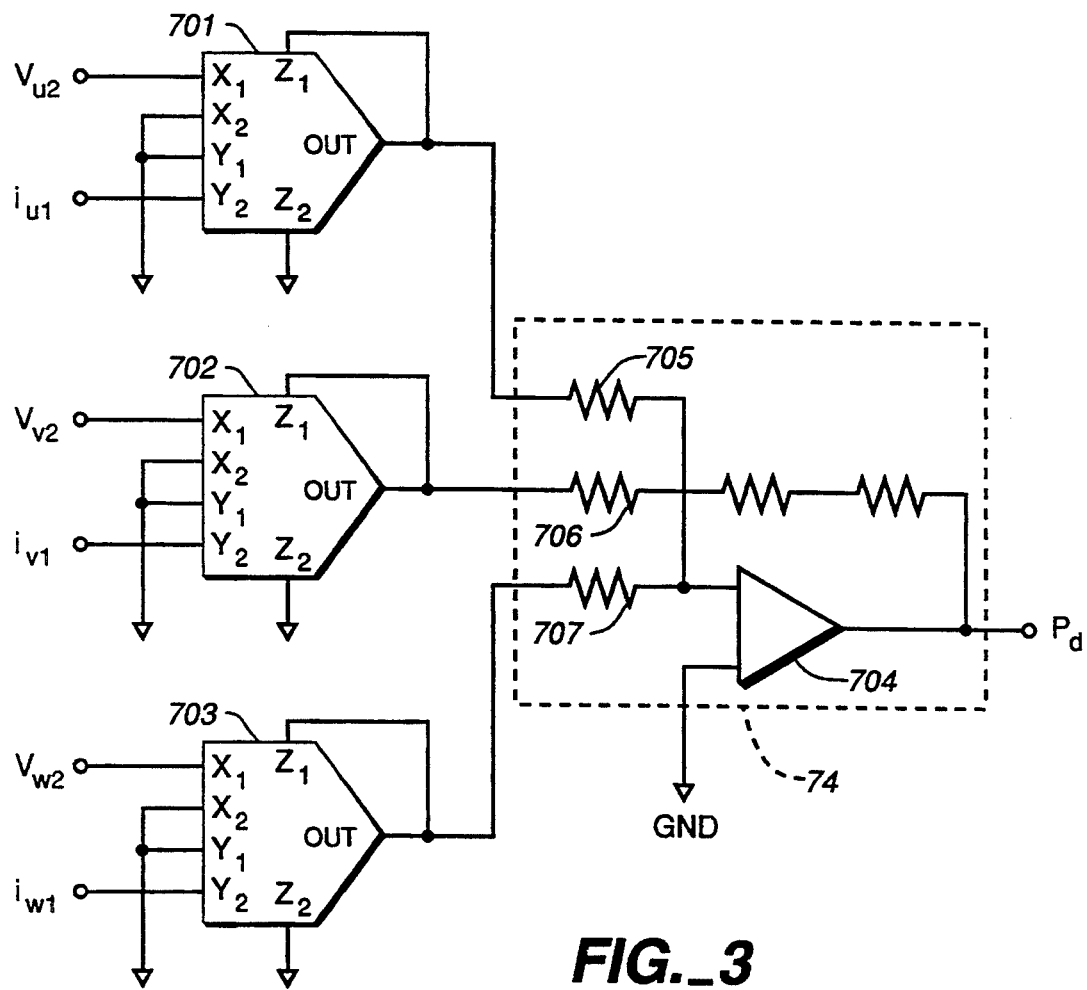
FIG._3

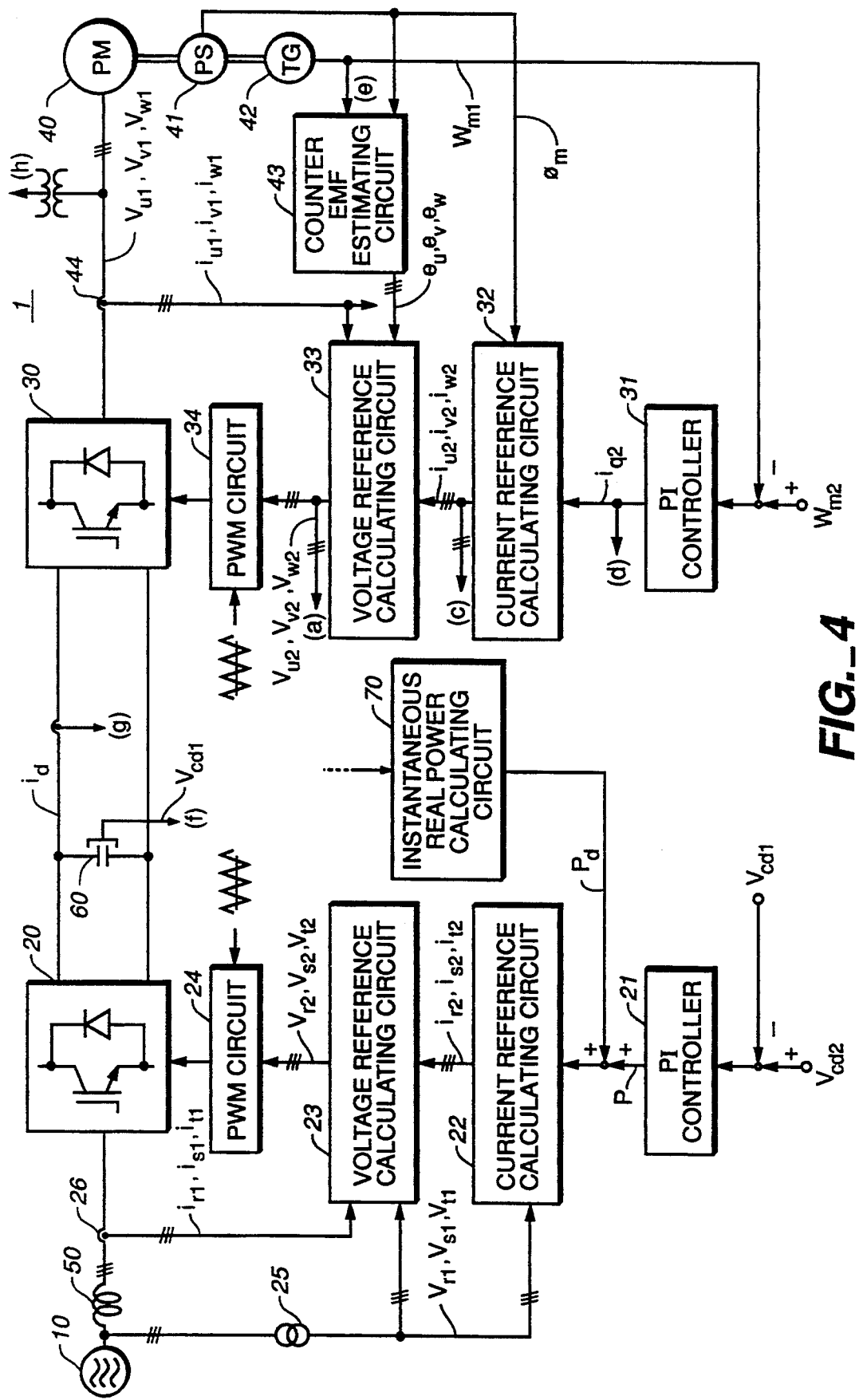
FIG._4

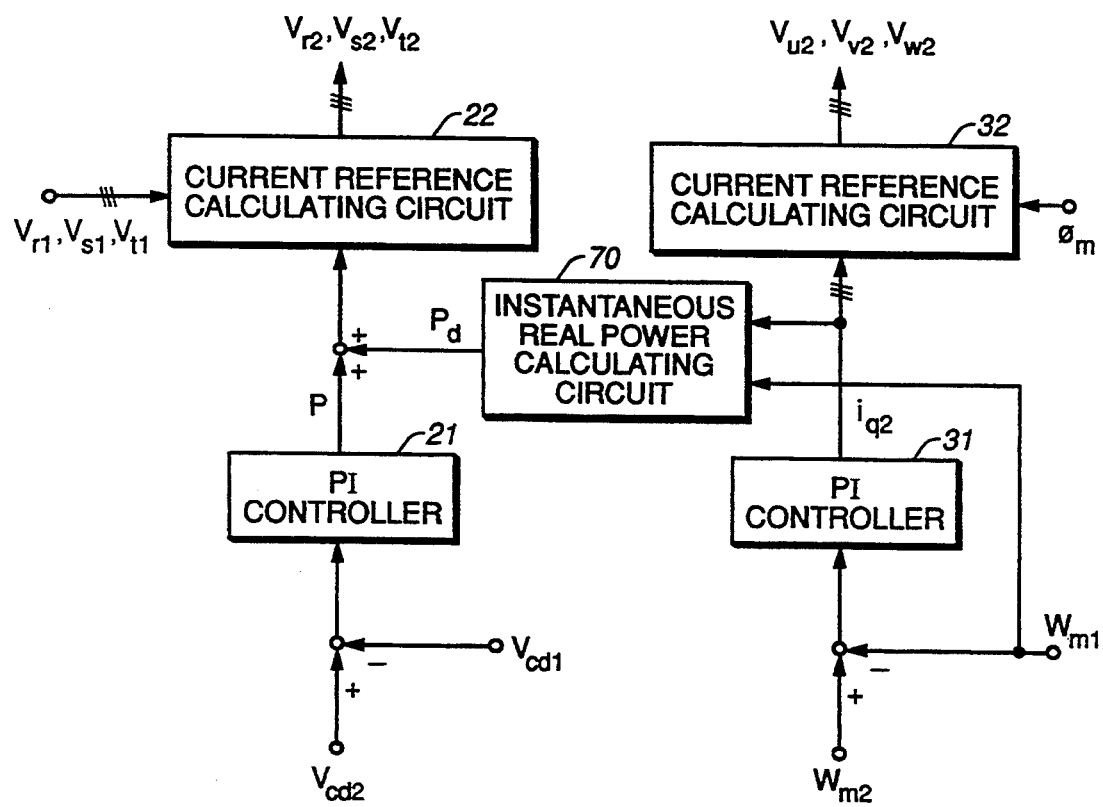
FIG._5

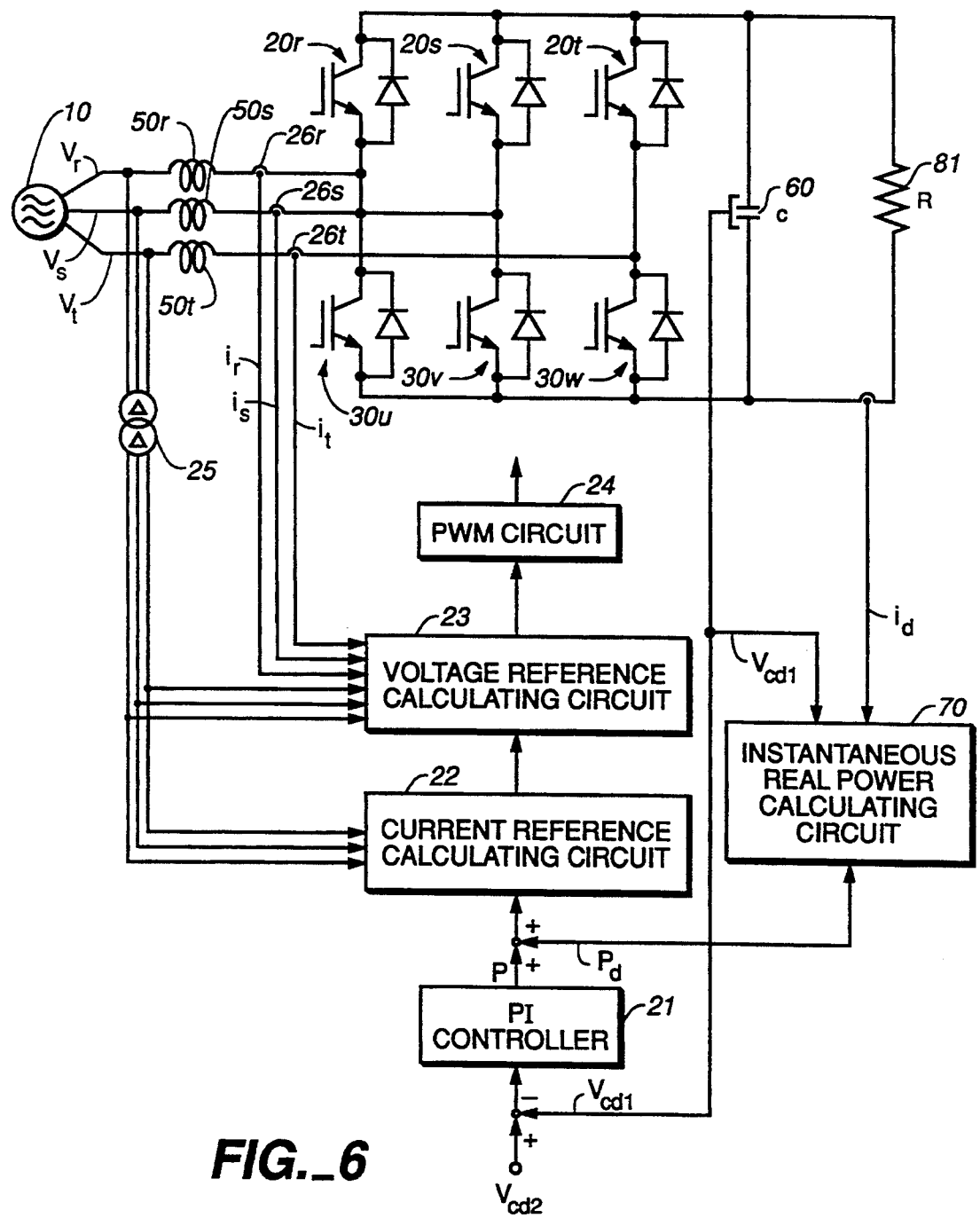
FIG._6

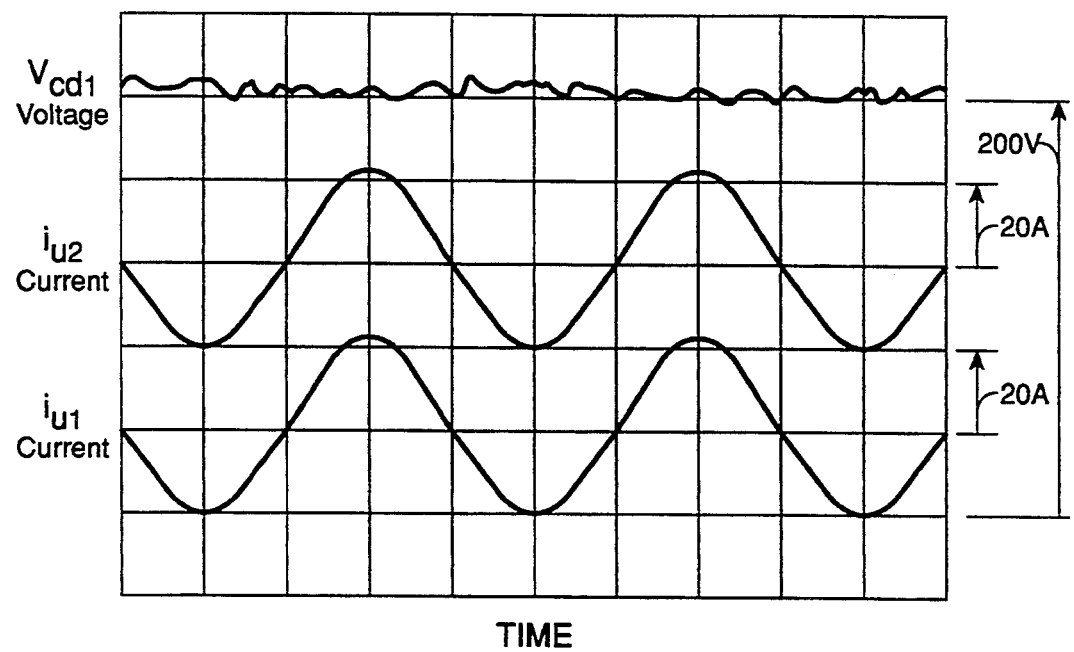
FIG._7
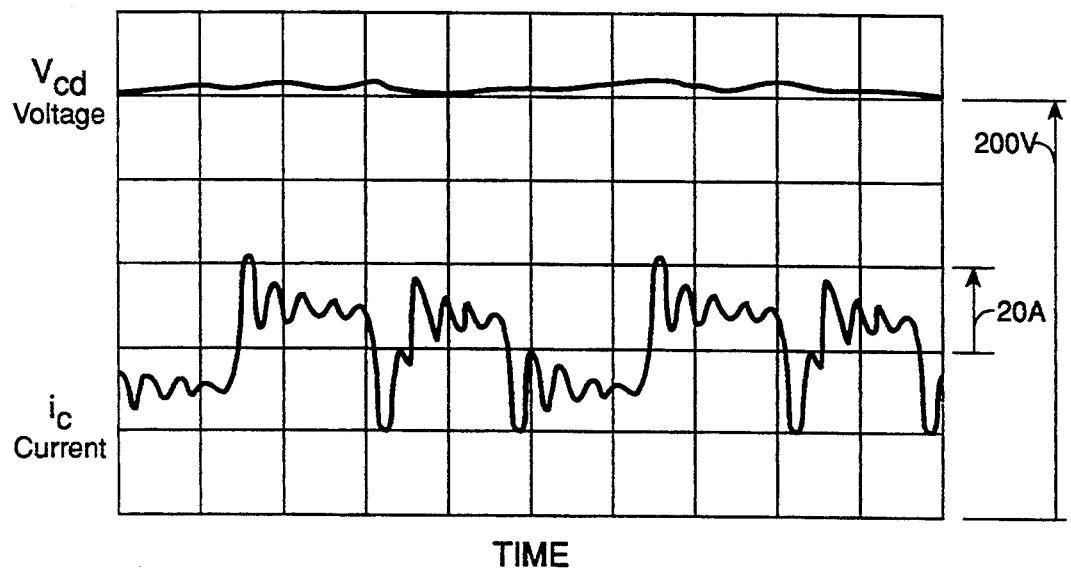
FIG._8

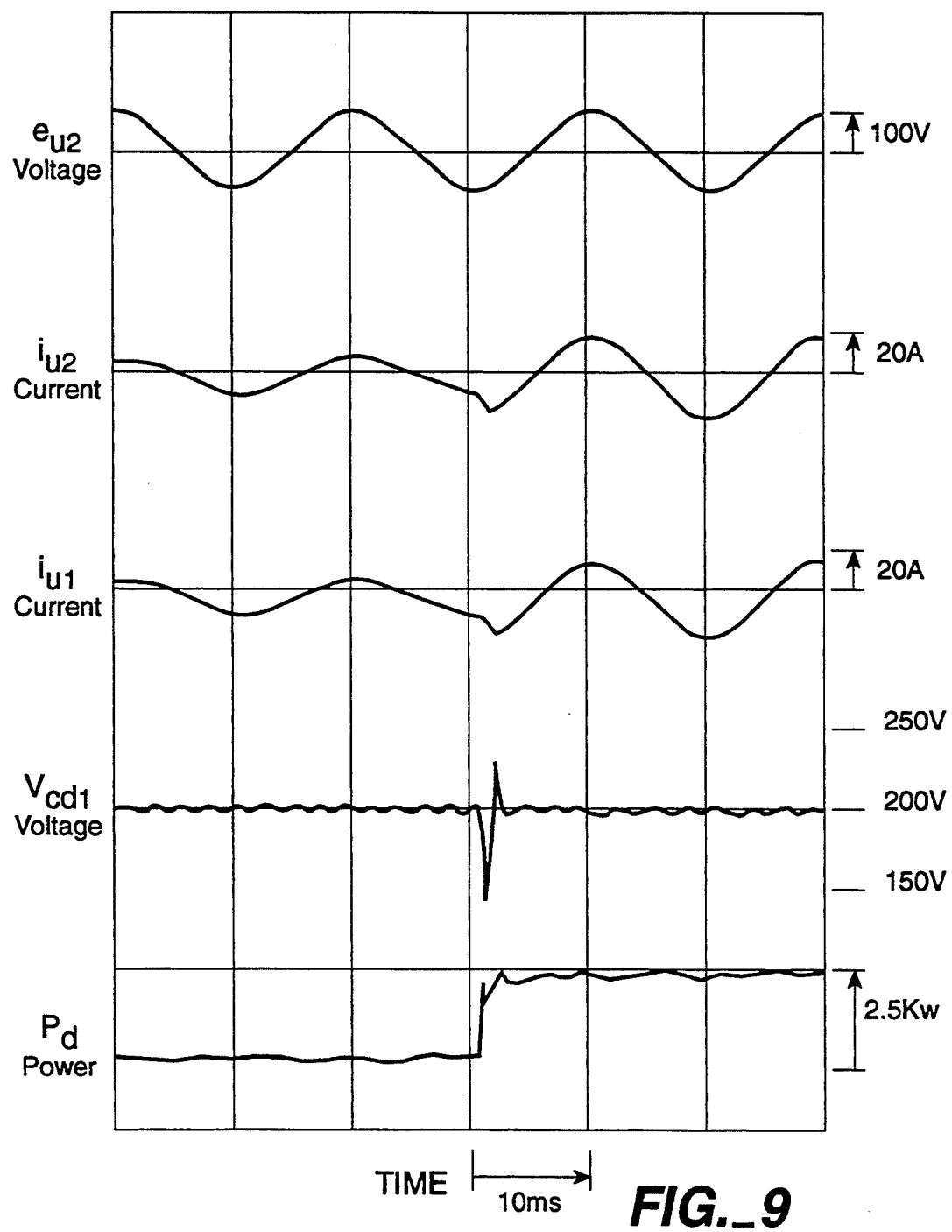
FIG._9

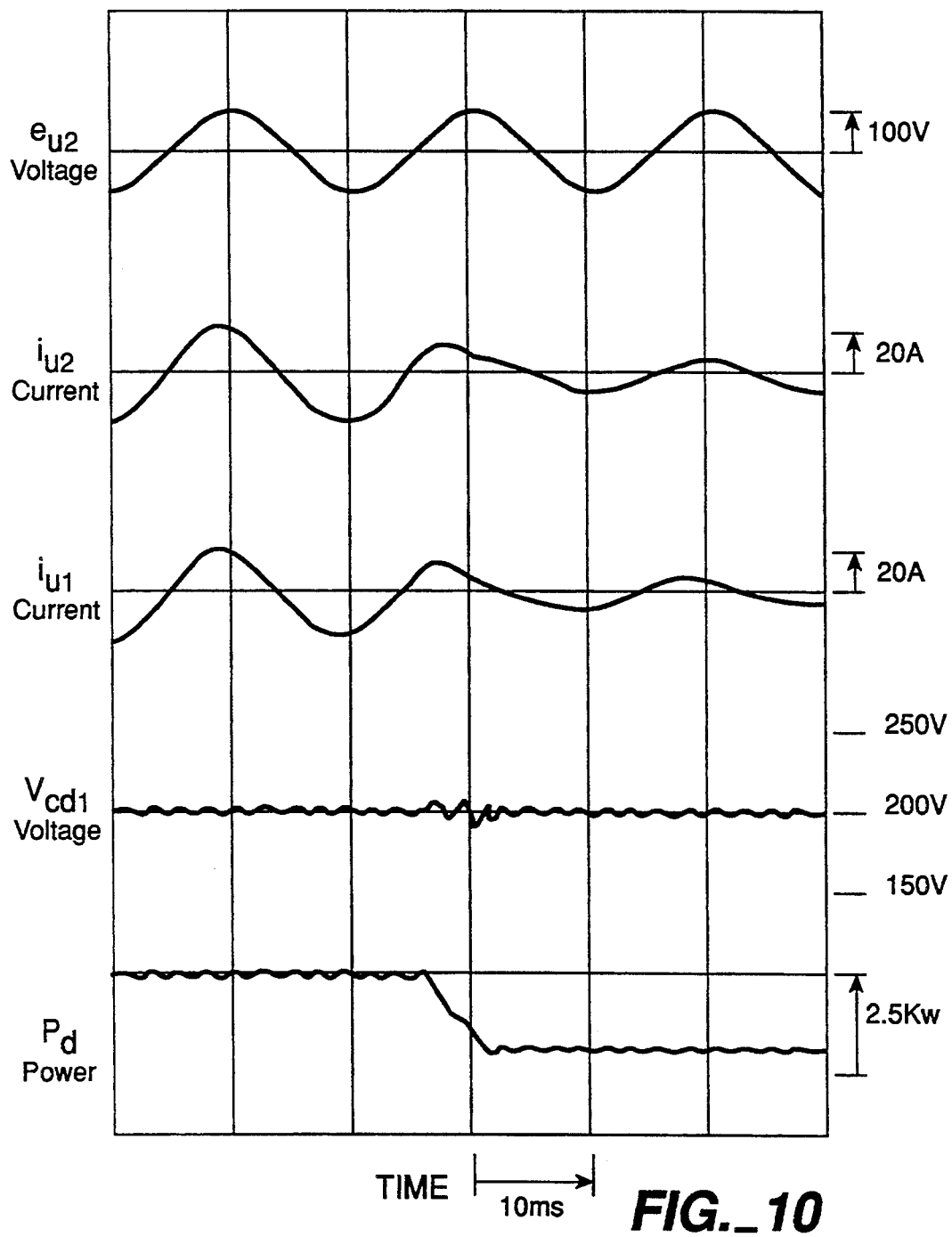
FIG._10

POWER CONVERTER/INVERTER SYSTEM WITH INSTANTANEOUS REAL POWER FEEDBACK CONTROL

This is a continuation of application Ser. No. 07/897,148 filed on Jun. 11, 1992, now abandoned which is a division of application Ser. No. 07/558,650 filed on Jul. 27, 1990, now U.S. Pat. No. 5,136,494.

BACKGROUND OF THE INVENTION

This invention relates generally to a voltage type pulse width modulation (PWM) converter/inverter system for converting waveforms of input and output currents to alternating or frequency waveforms, such as sinusodial waveforms, and to a method for controlling such a system. More particularly, this invention relates to control means for maintaining the direct current capacitor voltage constant not only during steady state conditions but also during transient state conditions.

Generally, a converter/inverter system is provided for converting an alternating current, such as in the case of commercial power, to a direct current by a converter. Then the direct current is smoothed by a smoothing circuit comprising a capacitor or the like for conversion back to an alternating current at a variable frequency determined by an inverter. PWM is one of the methods employed for controlling this type of system. In the sinusodial waveform, PWM control method, wherein waveforms of both input and output currents are converted to sinusodial waveforms, a converter and a direct current capacitor for performing the smoothing function generate a direct current of a constant voltage, i.e., a direct current power, from an alternating current of sinusodial waveform which is supplied to an inverter. The inverter converts this constant direct voltage into an alternating current frequency while controlling the pulse width uniformity whereby a power equal to the alternating current power of the sinusodial waveform is obtained.

The so-called feedback method of control has been employed for controlling the direct current capacitor voltage of a voltage PWM converter/inverter system, i.e., the terminal voltage of the smoothing capacitor. In this method, the direct current capacitor voltage is detected and its detected value is compared with a command or reference value to control the inverter. This control process is described in more detail, for example, in an article entitled, "High Performance AC Motor Speed Control System Using GTO Converters", T. Okuyama et al., *Proceedings of IPEC*, Tokyo '83, Institute of Electrical Engineers, April, 1983, pp. 720–731.

However, this conventional control process has a disadvantage in that it is difficult to control the direct current capacitor voltage, i.e., the voltage of the smoothing capacitor, to be maintained constant at the so-called transient state or stage, e.g., when the speed command of the motor load is abruptly changed, or there is an abrupt change in the load torque. Specifically, there is the danger that when power is regenerated, or when a load torque abruptly decreases, the direct current capacitor voltage rises, with an adverse result that switching devices employed in the converter and the inverter are damaged.

In the conventional control process, the feedback control is based on detection of only a change occurring relative to the terminal voltage of the direct current capacitor, and, accordingly, a detection delay is a disadvantage. In order to maintain the direct current capacitor voltage constant when there is an abrupt change in the load, it is necessary to set a large proportional gain, $K_p$, and integral gain, $K_i$, of the PI (proportional integral) controller employed in the feedback control system. However, large gains, $K_p$ and $K_i$, often make the control system unstable, and, due to its stability, the gains, $K_p$ and $K_i$, cannot be made too large.

Therefore, it is an object of this invention is to provide a voltage type PWM converter/inverter system to provide stable control at high speed for a direct current capacitor voltage between the terminals of the smoothing capacitor.

It is another object of this invention to provide a method for controlling a voltage PWM converter/inverter system resulting in continuous, controlled stability of the direct current capacitor voltage at high speed.

SUMMARY OF THE INVENTION

According to this invention, a voltage PWM converter/inverter system comprises converter means for converting an input alternating current power into a direct current power output; inverter means for converting the output direct current power provided by the converter means into an alternating current power output; smoothing means inserted between the converter means and the inverter means; instantaneous real power calculating means for calculating an instantaneous real power relative to the inverter means to output an instantaneous real power calculated value; converter control means for voltage PWM control of the converter means based on a set converter command value, a terminal direct current voltage value of the smoothing means, and the instantaneous real power calculated value; and inverter control means for voltage PWM control of the inverter means based on a set inverter command value and the alternating current power output the inverter means.

The voltage PWM converter/inverter system control method according to this invention wherein an input current and an output current can be simultaneously converted into alternating current waveforms and wherein a terminal voltage of smoothing means, e.g., a smoothing capacitor, inserted between a converter and an inverter is detected to provide feedback to the control system of the converter comprises calculating an instantaneous real power relative to the inverter and feeding back the calculated instantaneous real power to the control system of the converter.

In this invention, an instantaneous real power established relative to the inverter is calculated and the calculated result is provided as feedback to the control system of the converter. This enables the inverter and the converter to be balanced relative to the instantaneous real power, and, as a result, an abrupt rise in the direct current capacitor voltage during a transient state is prevented. Consequently, the advantageous effect is that the control of the capacitor voltage is stable and has transient characteristics can be realized. In other words, this invention can successfully overcome the conventional problems of capacitor failure which occurs over time in conventional converter/inverter systems when the load on the system varies due to transient state conditions thereby providing significantly improved reliability to the converter/inverter system. Furthermore, with the capacitance of the direct current smoothing capacitor remaining unchanged, the control system remains stable even in the cases where the gains, $K_i$ and $K_p$, for the control of the PI controller are increased. As a result, the method of PI control can easily be designed. On the other hand, in the case where the gains, $K_i$ and $K_p$, are maintained constant, the capacitance value of the smoothing capacitor can be significantly decreased, which contributes significantly to miniaturization of products employing the approach of this invention.

Other objects and attainments together with a fuller understanding of the invention will become apparent and appreciated by referring to the following description and claims taken in conjunction with the accompanying drawings, which are given by way of illustration only and, therefore, are not intended as limiting the scope of the present invention.

BRIEF DESCRIPTION OF THE DRAWINGS

FIG. 1 is a circuit block diagram of the overall voltage PWM converter/inverter system according to one embodiment of this invention.

FIG. 2 is a circuit block diagram of one embodiment of the instantaneous real power calculating circuit forming a major part of the system comprising this invention.

FIG. 3 is a circuit block diagram disclosing the details of the instantaneous real power calculating circuit shown in FIG. 2.

FIG. 4 is a circuit block diagram of the system according to another embodiment for explaining the method for controlling the voltage PWM converter/inverter system comprising this invention.

FIG. 5 is a circuit block diagram of another embodiment of the instantaneous real power calculating circuit for the system comprising this invention.

FIG. 6 is a block diagram of an experimental system for testing the effectiveness of the system comprising this invention.

FIG. 7 is an illustration of waveforms showing the steady state, stable characteristic obtained by experiment utilizing the experimental system shown in FIG. 6.

FIG. 8 is a voltage waveform and a current waveform occurring between the terminals of the system direct current capacitor.

FIGS. 9 and 10 are waveforms showing transient responses of respective portions of the voltage PWM converter/inverter system comprising this invention.

DESCRIPTION OF THE PREFERRED EMBODIMENTS

Reference is now made to FIG. 1 wherein there is shown the basic circuit of voltage PWM converter/inverter system 1 comprising this invention. System 1 comprises alternating current power source 10, converter 20 which rectifies a three phase alternating power signal supplied by alternating current source 10, and inverter 30 which generates an alternating power signal from the rectified direct current power in accordance with a rotational angular speed of permanent magnet synchronous motor (PM) 40. The load for inverter 30 is motor (PM) 40. An induction motor or other type alternating current motors may be employed in lieu of permanent magnet synchronous motor (PM) 40 and, in such a case, the control systems for converter 20 and inverter 30 would be slightly different but essentially have the same basic circuit structures.

As known in the art, reactor 50 inserted between alternating current power source 10 and converter 20 removes higher harmonic components from the signal and capacitor 60, e.g., a direct current capacitor, is inserted between converter 20 and inverter 30 for performing the smoothing function. The main circuits of converter 20 and of inverter 30 are conventional three phase bridge connections utilizing IGBT modules as their power elements.

The control system of converter 20 basically comprises PI controller 21 which compares a terminal voltage, i.e., the direct current capacitor voltage, $V_{cd1}$, of smoothing capacitor 60, with its command or reference value, $V_{cd2}$. Based on the result of this comparison, PI controller provides an outputs comprising the signal, P. Current reference calculating circuit 22 calculates current references or current reference values, $i_{r2}$, $i_{s2}$ and $i_{t2}$, based on detected values, $V_{r1}$, $V_{s1}$ and $V_{t1}$, via voltage detector 25, which detected values are proportional to the three phase input voltages supplied to converter 20, and based on signal, P, from PI controller 21. Voltage reference calculating circuit 23 calculates voltage references or voltage reference values, $V_{r2}$, $V_{s2}$ and $V_{t2}$, based on the reference values, $i_{r2}$, $i_{s2}$ and $i_{t2}$, the detected values, $i_{r1}$, $i_{s1}$ and $i_{t1}$, via current detector 26, which values are proportional to the three phase input currents supplied to converter 20 and the previously mentioned detected values, $V_{r1}$, $V_{s1}$ and $V_{t1}$. PWM circuit 24, which controls converter 20, based on voltage reference values, $V_{r2}$, $V_{s2}$ and $V_{t2}$, and a triangular wave carrier. In this embodiment, however, current reference calculating circuit 22 is supplied with a signal comprising the total of the signal, P, from PI controller 21 and the signal, $P_d$, from instantaneous real power calculating circuit 70. This is related to a characteristic of this invention which will be discussed in more detail later. For the purposes of immediate discussion, however, the signal, P, will be considered without the inclusion of the signal, $P_d$.

Converter 20 and its control system operate as follows. The terminal voltage of smoothing capacitor 60, i.e., a command or reference value, $V_{cd2}$, and the detected direct current capacitor voltage, $V_{cd1}$, are compared, and the resultant signal, P, is provided from PI controller 21. PI controller 21 computes the following formula (1):

$$P = K_p \cdot \int (V_{cd2} - V_{cd1}) + K_i \cdot \int (V_{cd2} - V_{cd1}) dt \tag{1}$$

where $K_p$ is the proportional gain, and $K_i$ is the integral gain.

Signal, P, is an instantaneous real power obtained by feeding back the direct current capacitor voltage to be applied to smoothing capacitor 60, and the instantaneous real power is supplied to current reference calculating circuit 22 as indicated in FIG. 1. Circuit 22 calculates relative to the following formula (2):

$$\begin{bmatrix} i_{r2} \\ i_{s2} \\ i_{t2} \end{bmatrix} = \sqrt{2/3} \begin{bmatrix} 1 \\ -1/2 & \sqrt{3}/2 \\ -1/2 & -\sqrt{3}/2 \end{bmatrix} \begin{bmatrix} V_\alpha & V_\beta \\ -V_\beta & V_\alpha \end{bmatrix}^{-1} \cdot \begin{bmatrix} P \\ 0 \end{bmatrix} \tag{2}$$

with $$\begin{bmatrix} V_\alpha \\ V_\beta \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} V_{r1} \\ V_{s1} \\ V_{t1} \end{bmatrix}$$

where $V_{r1}$, $V_{s1}$ and $V_{t1}$ are three phase input voltages to converter 20.

Current references, $i_{r2}$, $i_{s2}$ and $i_{t2}$, produced by current reference calculating circuit 22 are supplied to voltage reference calculating circuit 23. Current reference calculating circuit 23 calculates voltage references or reference values, $V_{r2}$, $V_{s2}$ and $V_{t2}$, for PWM control by PWM circuit 24 utilizing the following formulas (3), (4) and (5):

$$V_{r2} = K \bullet (i_{r2} - i_{r1}) + V_{r1} \tag{3}$$

$$V_{s2} = K \bullet (i_{s2} - i_{s1}) + V_{s1} \tag{4}$$

$$V_{t2} = K \bullet (i_{t2} - i_{t1}) + V_{t1} \tag{5}$$

In the case here, PWM circuit 24 employees the triangular wave comparison method for performing these calculations.

The control system for inverter 30 basically comprises PI controller 31 for comparing the angular speed signal, $W_{m1}$, of the load, in the form of motor 40, with command value, $W_{m2}$. Angular speed signal, $W_{m1}$, is provided by speed sensor (TG) 42 coupled to position sensor (PS) 41 of motor 40. Based on the result of comparison, a torque current command value, $i_{q2}$, is provided as an output to current reference calculating circuit 32. Current reference calculating circuit 32 provides for the output of current command or reference values, $i_{u2}$, $i_{v2}$ and $i_{w2}$, based on command value, $i_{q2}$, and a rotor position signal, $\theta_m$, of motor 40. Rotor position signal, $\theta_m$, is provided by position sensor 41. Voltage reference calculating circuit 33 provides an output comprising current references, $V_{u2}$, $V_{v2}$ and $V_{w2}$, based on current command or current reference values, $i_{u2}$, $i_{v2}$ and $i_{w2}$, the counter electromotive force estimated values, $e_u$, $e_v$ and $e_w$, and detected motor current values, $i_{u1}$, $i_{v1}$ and $i_{w1}$, from the output current of inverter 30 via current detector 44. Estimated values, $e_u$, $e_v$ and $e_w$, are supplied by counter electromotive force (EMF) estimating circuit 43 based on angular speed signal, $W_{m1}$, and rotor position signal, $\theta_m$. PWM circuit 34 controls inverter 30 based on the current reference or command values, $V_{u2}$, $V_{v2}$ and $V_{w2}$.

The operation of inverter 30 and its control system is as follows. PI controller 31 compares angular speed signal, $W_{m1}$, of motor 40 detected by speed sensor 42 with speed command value, $W_{m2}$, to produce a torque current command value, $i_{q2}$, indicative of the value of the angular speed signal, $W_{m1}$, necessary to agree with the speed command value, $W_{m2}$. The PI controller 31 calculates the following formula (6):

$$i_{q2} = K_p \bullet \int (W_{m2} - W_{m1}) + K_i \bullet \int (W_{m2} - W_{m1}) dt \tag{6}$$

where $K_p$ is the proportional gain, and $K_i$ is the integral gain.

Current reference value computing circuit 32 is supplied with a torque current command value, $i_{q2}$, and with rotor position signal, $\theta_m$, computes the following formulas (7), (8) and (9) to provide three phase current command values, $i_{u2}$, $i_{v2}$ and $i_{w2}$:

$$i_{u2} = \sqrt{2/3} \cdot i_{q2} \cdot \cos \theta_m \tag{7}$$

$$i_{v2} = \sqrt{2/3} \cdot i_{q2} \cdot \cos(\theta_m - 2/3\pi) \tag{8}$$

$$i_{w2} = \sqrt{2/3} \cdot i_{q2} \cdot \cos(\theta_m = 2/3\pi) \tag{9}$$

Voltage reference calculating circuit 33 calculates voltage reference or command values, $V_{u2}$, $V_{v2}$ and $V_{w2}$, by the following formulas (10), (11) and (12) for providing PWM control via PWM circuit 34:

$$V_{u2} = K_1 \bullet (i_{u2} - i_{u1}) + e_u \tag{10}$$

$$V_{v2} = K_1 \bullet (i_{v2} - i_{v1}) + e_v \tag{11}$$

$$V_{w2} = K_1 \bullet (i_{w2} - i_{w1}) + e_w \tag{12}$$

where $K_1$ is the gain.

The counter electromotive force estimated values, $e_u$, $e_v$ and $e_w$, are calculated based on rotor position, $\theta_m$, and angular speed signal, $W_{m1}$, via the following formulas (13) and (14):

$$e_u = K_2 \bullet W_{m1} \bullet \cos \theta_m \tag{13}$$

$$e_v = K_2 \bullet W_{m1} \bullet \cos(\theta_m - \tfrac{2}{3}\pi) \tag{14}$$

$$e_w = K_2 \bullet W_{m1} \bullet \cos(\theta_m + \tfrac{2}{3}\pi) \tag{15}$$

where $K_2$ is a constant relative to the type of motor 40. The three phase command voltage values, $V_{u2}$, $V_{v2}$ and $V_{w2}$, are employed for PWM control by PWM circuit 34 employing triangular wave comparison method, and, motor 40 is supplied with a sinusodial current waveform.

As shown in FIG. 1, instantaneous real power calculating circuit 70, which is a point of invention herein, is supplied with command values, $V_{u2}$, $V_{v2}$ and $V_{w2}$, by voltage reference calculating circuit 33 from the control system for inverter 30 as well as the motor currents, $i_{u1}$, $i_{v1}$ and $i_{w1}$, detected by current detector 44. Then, instantaneous real power calculating circuit 70 calculates an instantaneous real power calculated value, $P_d$, based on these voltage command or reference values and motor current values. The instantaneous real power calculated value, $P_d$, is also the so-called effective voltage. Instantaneous real power calculated value, $P_d$, is fed back to the control system for converter 20. In other words, the instantaneous real power, P, output of PI controller 21, which is the feedback voltage of direct current capacitor voltage applied to smoothing capacitor 60, and the load instantaneous real power, $P_d$, which is the calculated output of instantaneous real power calculating circuit 70, are combined, i.e., the sum of $P_d + P$, to provide calculated output, $P_T$, which is supplied to current reference calculating circuit 22 for control of converter 20. FIG. 2 shows the basic components of instantaneous real power calculating circuit 70. Circuit 70 comprises integrators 71, 72 and 73, for respectively integrating the reference values, $V_{u2}$, $i_{u1}$; $V_{v2}$, $i_{v1}$; and $V_{w2}$, $i_{w1}$. Adder 74 adds together the outputs of integrators 71, 72 and 73 to produce instantaneous real power calculated value, $P_d$. The instantaneous power, $P_d$, based on the outputs, $V_{u2}$, $V_{v2}$ and $V_{w2}$, and the motor current values, $i_{u1}$, $i_{v1}$ and $i_{w1}$, is calculated employing the following formula (16):

$$P_d = V_{u2} \bullet i_{u1} + V_{v2} \bullet i_{v1} + V_{w2} \bullet i_{w1} \tag{16}$$

A specific implementation of the basic structure of instantaneous real power calculating circuit 70 shown in FIG. 2 is shown in FIG. 3. In FIG. 3, multipliers 701, 702 and 703 respectively receive the reference values, $V_{u2}$, $i_{u1}$; $V_{v2}$, $i_{v1}$; and $V_{w2}$, $i_{w1}$, and adder 74 comprises operational amplifier and respective summing resistors 705, 706 and 707. Instantaneous real power calculating circuit 70 of FIG. 3 also calculates the instantaneous real power calculated value, $P_d$, employing formula (16).

The calculated instantaneous real power value, $P_d$, is added to the signal, P, from PI controller 21 for the purpose of performing the calculation by current reference calculating circuit 22 employing the following reference formula (17):

$$\begin{bmatrix} i_{r2} \\ i_{s2} \\ i_{t2} \end{bmatrix} = \sqrt{2/3} \begin{bmatrix} 1 \\ -1/2 & \sqrt{3}/2 \\ 1/2 & \sqrt{3}/2 \end{bmatrix} \begin{bmatrix} V_\alpha & V_\beta \\ -V_\beta & V_\alpha \end{bmatrix}^{-1} \cdot \begin{bmatrix} P + P_d \\ 0 \end{bmatrix} \quad (17)$$

with $$\begin{bmatrix} V_\alpha \\ V_\beta \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} V_{r1} \\ V_{s1} \\ V_{t1} \end{bmatrix}$$

where $V_{r1}$, $V_{s1}$ and $V_{t1}$ are three phase input voltages to converter 20.

The difference between formula (17) and previous formula (2) is that the former contains the instantaneous real power calculated output, $P_d$. Thus, the inverter side and the converter side of the control system can be balanced with respect to the instantaneous real power, which provides a solution to the problem in the conventional method of control. In other words, even when the gains, $K_p$ and $K_i$, in formula (1) are made to be small, an instantaneous real power relative to inverter 30 is detected without any time lag for supply to current reference calculating circuit 22 relative to converter 20 and, accordingly, a direct current capacitor voltage to be supplied to smoothing capacitor 60 is provided in a stable manner at high speed.

The signal to be supplied to instantaneous real power calculating circuit 70 for the calculation of the signal, $P_d$, is not limited to the foregoing described embodiment as various other signals may be employed as the basis for calculating the instantaneous real power, $P_d$, relative to inverter 30 as is exemplified relative to FIG. 4, which is similar in content to FIG. 1. As can be seen from an examination of FIG. 4, the signals indicated at (a) and (b) in FIG. 4, i.e., the voltage references, $V_{u2}$, $V_{v2}$ and $V_{w2}$ and the motor current values, $i_{u1}$, $i_{v1}$ and $i_{w1}$, are employed to calculate the instantaneous real power, $P_d$, and the calculating formula employed is formula (16). However, employing signals (a) and (c) in FIG. 4, i.e., the voltage references, $V_{u2}$, $V_{v2}$ and $V_{w2}$ and the current references, $i_{u2}$, $i_{v2}$ and $i_{w2}$ of the control system of inverter 30, the instantaneous real power, $P_d$, can be computed by the following formula (18):

$$P_d = V_{u2} \bullet i_{u2} + V_{v2} \bullet i_{v2} + V_{w2} \bullet i_{w2} \quad (18)$$

It is also possible to calculate the instantaneous real power, $P_d$, employing signals (d) and (e) in FIG. 4, i.e., the torque current command value, $i_{q2}$, from the output of PI controller 31 of the inverter control system for inverter 30, and the motor angular speed signal, $W_{m1}$, $$P_d = PM \bullet W_{m1} \bullet i_{q2} \quad (19)$$

where PM is the motor constant.

FIG. 5 shows a major portion of system 1 according to an embodiment wherein formula (19) is employed by instantaneous real power calculating circuit 70. As shown by formula (19), the motor angular speed, $W_{m1}$, and the torque current command value, $i_{q2}$, are provided to instantaneous real power calculating circuit 32 to control system 1.

It is also possible to calculate the instantaneous real power, $P_d$, employing signals (f) and (g) in FIG. 4, i.e., employing the direct current voltage value, $V_{cd1}$, and the input current, $i_d$, to inverter 30, the instantaneous real power, $P_d$, can be calculated by the following formula (20):

$$P_d = V_{cd1} \bullet i_d \quad (20)$$

It is also possible to calculate the instantaneous real power, $P_d$, employing the following formulas (21) and (22):

$$P_d = V_{u1} \bullet i_{u1} + V_{v1} \bullet i_{v1} + V_{w1} \bullet i_{w1} \quad (21)$$

employing signals (b), the current references, $i_{u1}$, $i_{v1}$ and $i_{w1}$, based up the motor input currents, and signals (h), the motor input voltages, $V_{u1}$, $V_{v1}$ and $V_{w1}$. Also, $$P_d = V_{u1} \bullet i_{u2} + V_{v1} \bullet i_{v2} + V_{w1} \bullet i_{w2} \quad (22)$$

employing signals (c) and (h) in FIG. 4, respectively, the current references, $i_{u2}$, $i_{v2}$ and $i_{w2}$ of the control system of inverter 30 and the motor input voltages, $V_{u1}$, $V_{v1}$ and $V_{w1}$.

PWM circuits 24 and 34 utilized in the embodiment of FIG. 1 employ the triangular wave comparison method, as known in the art but other methods may be employed, such as, the instantaneous value comparison method. Without counter EMF estimating circuit 43 described in FIG. 1, the system has the same structure, but it is necessary to increase the gain, $K_1$, in formulas (10), (11) and (12). However, it is preferable that the gain, $K_1$, is smaller relative to stability, and, in such case, the counter EMF estimated values, $e_u$, $e_v$ and $e_w$, are supplied to voltage reference calculating circuit 33. Furthermore, the power devices for converter 20 and inverter 30 need not necessarily be IGBT modules but rather may be any type of switch devices, e.g., bipolar transistors, MOSFET, GTO, SIT, thyristors, etc. Instantaneous real power calculating circuit 70 and counter EMF estimating circuit 43 may be of other circuit types provided that they provide the corresponding outputs described above relative to these particular circuits.

FIG. 6 discloses a circuit for testing the effectiveness of this invention and comprises resistance load 81 to function as a load in place of inverter 30 and motor 40. The remaining portions of the test circuit have already been described in connection with FIG. 1 except that the multiphase components are illustrated such as reactors $50_r$, $50_s$ and $50_t$; current detectors $26_r$, $26_s$ and $26_t$ and parallel coupled IGBT modules $20_r$, $20_s$, $20_t$, $20_u$, $20_v$ and $20_w$ comprising converter 20. Reactors $50_r$, $50_s$ and $50_t$ have a value of 0.75 mH, smoothing capacitor 60 has a capacitance of 20 μF, and the carrier frequency of the triangular wave supplied to PWM circuit 24 is 10

KHz. The contact voltage of load 81 is the direct current capacitor voltage, $V_{cd1}$, and the current flowing through load 81 is the current, $i_d$. Their product is the instantaneous real power calculated value, $P_d$, provided by instantaneous power calculating circuit 70.

FIG. 7 shows the steady characteristic of the case in which the command value, $V_{cd2}$, of the direct current capacitor voltage is 200 V constant, and the consumed power of load 81 is 2.4 KW. The respective curves in FIG. 7, beginning from the top of the figure, indicate the capacitor voltage, $V_{cd1}$, the U-phase current reference value, $i_{u2}$, the U-phase input current, $i_{u1}$. It can be seen from FIG. 7 that the actual input current accurately follows the current reference or command value.

FIG. 8 shows the voltage waveform and the current waveform of the direct current capacitor during the conditions shown in FIG. 7. FIGS. 9 and 10 show the transient response in the case where the capacitor voltage command value, $V_{cd2}$, is set at a constant 200 V and the consumed power of the load abruptly changes between 0.8 KW and 2.4 KW. FIG. 9 shows waveforms for the case in which the consumed power is increased from 0.8 KW to 2.4 KW relative to an increased load situation. FIG. 10 shows waveforms for the case in which the consumed power is decreased from 2.4 KW to 0.8 KW relative to a decreased load situation. Beginning with the top of FIG. 9, the respective waveforms indicate the U-phase voltage, $e_{u2}$, the U-phase current command value, $i_{u2}$, the U-phase input current, $i_{u1}$, the capacitor voltage, $V_{cd1}$, and the calculated load power, $P_d$. As shown in FIG. 9, with a quick load change of less than 1 ms, the voltage change of a maximum of 50 V occurs because of the delay of the control system. In contrast to this, the voltage change with the load change of around 3 ms is suppressed as low as around 15 V. While the foregoing result is relative to an experiment wherein resistance is employed as the load, the same resulting effect can be expected wherein the load is motor 40.

The system according to this invention has been explained relative to embodiments employing a motor as the load. The system according to this invention employs a three phase commercial power source and is applicable to machines and instruments wherein the motor is electrically driven at variable speeds, e.g., motors employed in home and office equipment, machines and instruments; power motors for factory automation (FA) machines and robots and instruments; power motors for mobile units; and in other technical fields wherein motors are employed under variable speed conditions. The load may also be coils employed in high frequency furnaces rather than motors. This invention is applicable to frequency converters for converting commercial frequencies to desired alternating frequencies.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope the appended claims.

What is claimed is:

1. A power converter/inverter system for a load comprising:
    converter means for converting an alternating current (AC) power input into a direct current (DC) power intermediate signal in response to a first PWM voltage signal;
    inversion means for converting the DC power intermediate signal into an AC type power output in response to a second PWM voltage signal;
    smoothing means in series between said conversion means and inversion means for filtering the DC power intermediate signal;
    instantaneous real power (IRP) calculating means for calculating an IRP relative to said inversion means determined by a torque current command value and a load angular speed signal, and outputting an IRP product;
    conversion control means controlling the first PWM voltage of the converter means based on a combination of a predetermined converter amplitude setpoint, a DC voltage present at the DC power intermediate signal, and the IRP product; and
    inverter control means for controlling the second PWM voltage of said inverter means based on an inverter amplitude setpoint and the amplitude of the AC power output.

2. The power converter/inverter system of claim 1 wherein said load comprises a motor, said IRP determined from the product of the torque current command value, the load angular speed signal, and a motor constant.

3. A method for transforming a first AC power signal into a second AC power signal employing a combination AC-to-DC converter and a DC-to-AC inverter, the method comprising the steps of:
    calculating an instantaneous real power (IRP) from a torque current command value and a load angular speed signal providing an IRP product; and
    correcting the output of the converter with converter control means that is responsive to the IRP product, the correction such that a stable AC output level is obtained from the inverter.

4. The method of claim 2 wherein said step of calculating the IRP is determined from the product of the torque current command value, the load angular speed signal, and a motor constant.

* * * * *